United States Patent
Ehrhard et al.

(10) Patent No.: US 11,168,579 B2
(45) Date of Patent: Nov. 9, 2021

(54) TURBOCHARGER DEVICE WITH SPRING ELEMENT FOR CLAMPING THE GUIDE DEVICE AGAINST THE TURBINE HOUSING, AND SPRING ELEMENT

(71) Applicant: VITESCO TECHNOLOGIES GMBH, Hannover (DE)

(72) Inventors: Jan Ehrhard, Wiesloch (DE); Holger Faeth, Fussgoenheim (DE); Daniel Kraus, Regensburg (DE); Lukasz Przada, Viernheim (DE); Benjamin Adler, Gruenstadt (DE); Hildegard Lang, Regensburg (DE); Simon Pflaum, Regensburg (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 16/652,141

(22) PCT Filed: Sep. 10, 2018

(86) PCT No.: PCT/EP2018/074259
§ 371 (c)(1),
(2) Date: Mar. 30, 2020

(87) PCT Pub. No.: WO2019/072464
PCT Pub. Date: Apr. 18, 2019

(65) Prior Publication Data
US 2020/0248578 A1 Aug. 6, 2020

(30) Foreign Application Priority Data

Oct. 10, 2017 (DE) .......................... 102017218050

(51) Int. Cl.
*F01D 17/16* (2006.01)
*F01D 25/16* (2006.01)
*F02B 37/00* (2006.01)

(52) U.S. Cl.
CPC ............. *F01D 17/16* (2013.01); *F01D 25/16* (2013.01); *F02B 37/00* (2013.01);
(Continued)

(58) Field of Classification Search
CPC ........ F01D 17/16; F01D 25/16; F01D 17/165; F02B 37/00; F05B 2220/40;
(Continued)

(56) References Cited

U.S. PATENT DOCUMENTS 8,662,833 B2 * 3/2014 Wengert ................ F01D 25/246
415/160
9,163,557 B2  10/2015 Blummel et al.
(Continued)

FOREIGN PATENT DOCUMENTS

DE    102007057309 A1   6/2009
DE    102008005404 A1   7/2009
(Continued)

*Primary Examiner* — Hoang M Nguyen
(74) *Attorney, Agent, or Firm* — Laurence A. Greenberg; Werner H. Stemer; Ralph E. Locher

(57) ABSTRACT

A turbocharger device includes an annular spring element for axially clamping a guide device of a variable turbine geometry against a turbine housing. The annular spring element rests radially outwardly on the bearing housing and radially inwardly on a component of the guide device. The spring element has an annular radial outer flange in contact with the bearing housing, and a plurality of tabs which extend from the outer flange radially inwardly in the direction of the guide device and come into contact with a component thereof. An annular spring element for such a turbocharger is also provided.

13 Claims, 4 Drawing Sheets

(52) U.S. Cl.
CPC ..... *F05B 2220/40* (2013.01); *F05B 2240/123* (2013.01); *F05B 2240/50* (2013.01)

(58) Field of Classification Search
CPC ............ F05B 2240/123; F05B 2240/50; F05D 2220/40; F05D 2260/38; F05D 2250/90
USPC ......... 60/605.1; 417/406–407; 415/160, 163, 415/164, 165, 206
See application file for complete search history.

(56) References Cited

U.S. PATENT DOCUMENTS

| | | | |
|---|---|---|---|
| 2009/0060737 A1* | 3/2009 | Frankenstein | ............ F16F 1/32 |
| | | | 415/229 |
| 2010/0166541 A1 | 7/2010 | Hausser et al. | |
| 2010/0232937 A1 | 9/2010 | Wengert et al. | |
| 2011/0014036 A1* | 1/2011 | Boening | ................. F16F 1/324 |
| | | | 415/177 |
| 2012/0257966 A1* | 10/2012 | Boening | ............... F04D 25/024 |
| | | | 415/229 |
| 2014/0186745 A1* | 7/2014 | Metz | ..................... F04D 29/057 |
| | | | 429/514 |
| 2014/0212306 A1 | 7/2014 | Fleig et al. | |

FOREIGN PATENT DOCUMENTS

| | | |
|---|---|---|
| DE | 102009004737 A1 | 7/2009 |
| DE | 102008064299 A1 | 7/2010 |
| DE | 102009012065 A1 | 9/2010 |
| DE | 102011086310 A1 | 5/2013 |
| JP | 2010229908 A | 10/2010 |
| JP | 2017067033 A | 4/2017 |
| WO | 2009068460 A1 | 6/2009 |

\* cited by examiner

TURBOCHARGER DEVICE WITH SPRING ELEMENT FOR CLAMPING THE GUIDE DEVICE AGAINST THE TURBINE HOUSING, AND SPRING ELEMENT

BACKGROUND OF THE INVENTION

Field of the Invention

The present invention concerns a turbocharger device, in particular for an exhaust gas turbocharger of an internal combustion engine, with a bearing housing, a shaft arranged rotatably in the bearing housing, a turbine wheel arranged on the shaft, a turbine housing for the turbine wheel, a guide device of a variable turbine geometry arranged between the bearing housing and the turbine housing, and an annular spring element arranged between the bearing housing and guide device for axially clamping the guide device against the turbine housing, wherein the annular spring element rests radially outwardly on the bearing housing and radially inwardly on a component of the guide device.

In modern motor vehicles, increasingly so-called exhaust gas turbochargers with variable turbine geometry (VTG) are used, in which the power output and response behavior can be adapted to different operating conditions of the internal combustion engine. The variable turbine geometries used therein have a guide device with rotatable guide blades, and are usually clamped against a turbine housing of the turbocharger device by means of a spring element, in particular by means of a cup spring.

Thus for example DE 10 2008 064 299 A1 discloses a turbocharger device in which a one-piece cup spring presses a guide blade ring of the variable turbine geometry against the turbine housing. The one-piece cup spring has a bent edge region forming a spring leg, while a protective leg of the cup spring is formed as a heat shield for the spring leg. The spring leg here rests radially inwardly on the bearing housing and radially outwardly on the guide device of the variable turbine geometry, and clamps the latter against the turbine housing.

DE 10 2008 005 404 A1 discloses a turbocharger device in which two cup springs, which rest with one end on the guide device, are arranged between the guide device and the bearing housing, wherein a first cup spring is arranged in the radial direction between the rotation axis of the turbine wheel and the pivot bearings of the guide blades, and a second cup spring is arranged in the radial direction on the side of the pivot bearings facing away from the rotation axis of the turbine wheel. Both cup springs seal an adjustment space, provided with an adjustment mechanism of the guide device, against the flow channel.

In exhaust gas turbochargers with variable turbine geometry (VTG), often guide devices are used which have a cartridge-like design. Attaching the cartridge requires centering (coaxial alignment of cartridge and turbocharger axis), rotational alignment (security against twisting) and axial fixing or positioning of the cartridge relative to the turbine wheel.

In order to guarantee the functionality of the cartridge, i.e. blade adjustment with low hysteresis and low wear, it is essential that the constraint forces exerted on the cartridge in operation are minimized. These constraint forces may be firstly forces from mounting on the engine (exhaust gas system plus pipework), and secondly forces arising from the fixing, which prevent or restrict thermal equalization between components with different thermal expansion rates.

It has been found suitable in practice to press the guide device or cartridge against the turbine housing by means of a spring element, and hence position it axially relative to the turbine wheel. Such a prior art is described in both publications cited above.

The spring element described in the above-mentioned DE 10 2008 064 299 A1 is formed as a heat shield with integral cup spring function, which rests radially inwardly on the bearing housing and radially outwardly on the blade ring of the guide device. The spring properties of the component can compensate for deformations in the entire system (due to external forces or thermal expansion). However, because of the demand for higher exhaust gas temperatures, the individual components are subjected to increasing thermal load. With such spring elements in particular, it may occur that under high exhaust gas temperatures, these can no longer exert the force necessary for fixing since the spring leg creating the clamping bears radially outwardly on the guide device and radially inwardly on the bearing housing.

In the arrangement described in DE 10 2008 005 404 A1, the radially outer cup spring indeed rests radially outwardly on the bearing housing and radially inwardly on the guide blade ring of the guide device, but the cup spring here has a circumferentially closed and flat profile, which indeed seals the corresponding flow channel of the turbine housing but leaves room for improvement with respect to optimal function because of the closed design.

The present invention is based on the object of providing a turbocharger device of the type described initially which achieves optimized function with largely low load on the provided spring element.

SUMMARY OF THE INVENTION

This object is achieved according to the invention in a turbocharger device of the type described initially, in that the annular spring element has an annular radial outer flange in contact with the bearing housing, and a plurality of tabs which extend from the outer flange radially inwardly in the direction of the guide device and come into contact with a component thereof.

In order to achieve a particularly balanced force on the guide device, according to the invention a spring element is proposed which resembles a release spring (e.g. in a car clutch). The spring element has an annular radial outer flange in the form of a closed or continuous outer ring which bears on the bearing housing. Spring tabs, which press on a corresponding component of the guide device, protrude radially inwardly. The spring tabs center the spring element relative to the bearing housing and/or with respect to the corresponding component of the guide device.

As a whole, the annular spring element is arranged in a radially outer region of the turbocharger device, so that the temperature load on the spring element is low and an evenly high force can be exerted on the guide device, and hence on the turbine housing, over the entire operating range of the turbine. In addition, the spring element is cooler in the radially outer region than in the inner region, which leads to a smaller force loss, so that the spring element attempts to straighten itself on the inside in the hot state because of the greater thermal expansion (greater spring height and hence higher force). Due to the more central arrangement of the force application, a smaller deformation of the components occurs and a more even blade gap, which in turn may lead to a gap reduction and hence to greater efficiency.

It is essential to the invention that the spring element bears radially outwardly on the cold component (bearing housing) and radially inwardly on the hot component (guide device, VTG cartridge).

Preferably, the tabs have a portion extending obliquely radially inwardly in the direction of the guide device and a radial inner flange adjacent thereto, which runs in particular parallel to the annular outer flange and is in contact with the component of the guide device. The continuous outer flange of the spring element and the individual inner flanges of the respective tabs thus in particular run parallel to each other and bear superficially on corresponding faces of the bearing housing and guide device. They have a radial distance from each other which is bridged by the oblique portion of the tabs.

The annular radial outer flange may be formed as a completely closed, continuous ring. However, notches or cutouts may also be made to form tabs. The notches or cutouts may start from the inner circumference or from the outer circumference of the outer flange.

The radial inner flange of the tabs preferably has an angled spring arm portion adjacent thereto. This spring arm portion is preferably bent over or folded towards the side of the guide device.

In a particular embodiment of the invention, the annular spring element is arranged between the bearing housing and a blade ring of the guide device. The tabs of the annular spring element here press against the blade ring between the individual blades of the guide device. In a particular embodiment, the radial inner flange of the tabs bears superficially on an axially protruding portion of the blade ring and engages around this with the angled spring arm portion. The axially protruding portion of the blade ring here protrudes in the direction of the bearing housing, and the angled spring arm portion of the tabs engages around the protruding portion on its radial inside in the direction of the turbine housing.

In particular, the annular spring element is fixed in the circumferential direction on the respective component of the guide device, in particular the guide blade ring, via an additional tab and/or a pin. In this way, the spring element can be oriented.

As already mentioned initially, it is known in the prior art to produce the spring element as a heat shield with integral cup spring function. The present invention deviates from this principle and separates the two functions of "heat shield" and "spring element". Therefore a two-piece component is provided. In this embodiment therefore, the turbocharger device according to the invention, in addition to and radially inside the annular spring element, has a component serving as a heat shield between the bearing housing and the turbine wheel. The component serving as a heat shield preferably extends in annular fashion around the shaft up to a blade ring of the guide device, which in the embodiment described above also supports the inner flange of the tabs of the radially outwardly arranged annular spring element. The component serving as a heat shield therefore shields the directly adjacent region between the bearing housing and turbine wheel, while the annular component arranged radially outside this exerts the corresponding spring function and presses or clamps the guide device, in particular the guide blade ring, against the turbine housing.

The annular spring element here in particular presses axially against the component serving as a heat shield. It therefore holds this component in its axial position. There is therefore no longer a need for a spring property of the component serving as a heat shield, so the latter may also be made of a cheaper material.

As already stated above, the radial inner flange of the tabs may have an angled spring arm portion adjacent thereto. This angled spring arm portion may rest both on the bearing housing and on the blade ring. The corresponding spring arm portions of the individual tabs may radially center the guide device (VTG cartridge). The spring arm portions may here rest both on the bearing housing and on the blade ring.

Preferably, the angled spring arm portions are configured so as to have an inner spring arm and an outer spring arm. These inner and outer spring arms may either be arranged together on one spring tab or alternately on adjacent spring tabs. The inner spring arms may rest on the blade ring and the outer spring arms on the bearing housing, or vice versa.

The annular spring element is preferably made of heat-resistant sheet metal with spring properties.

The present invention furthermore concerns an annular spring element for axially clamping a guide device of a variable turbine geometry against the turbine housing for a turbocharger device of the type described above.

The invention will be explained in detail below with reference to an exemplary embodiment in conjunction with the drawing.

DETAILED DESCRIPTION OF THE INVENTION

Figure 1:
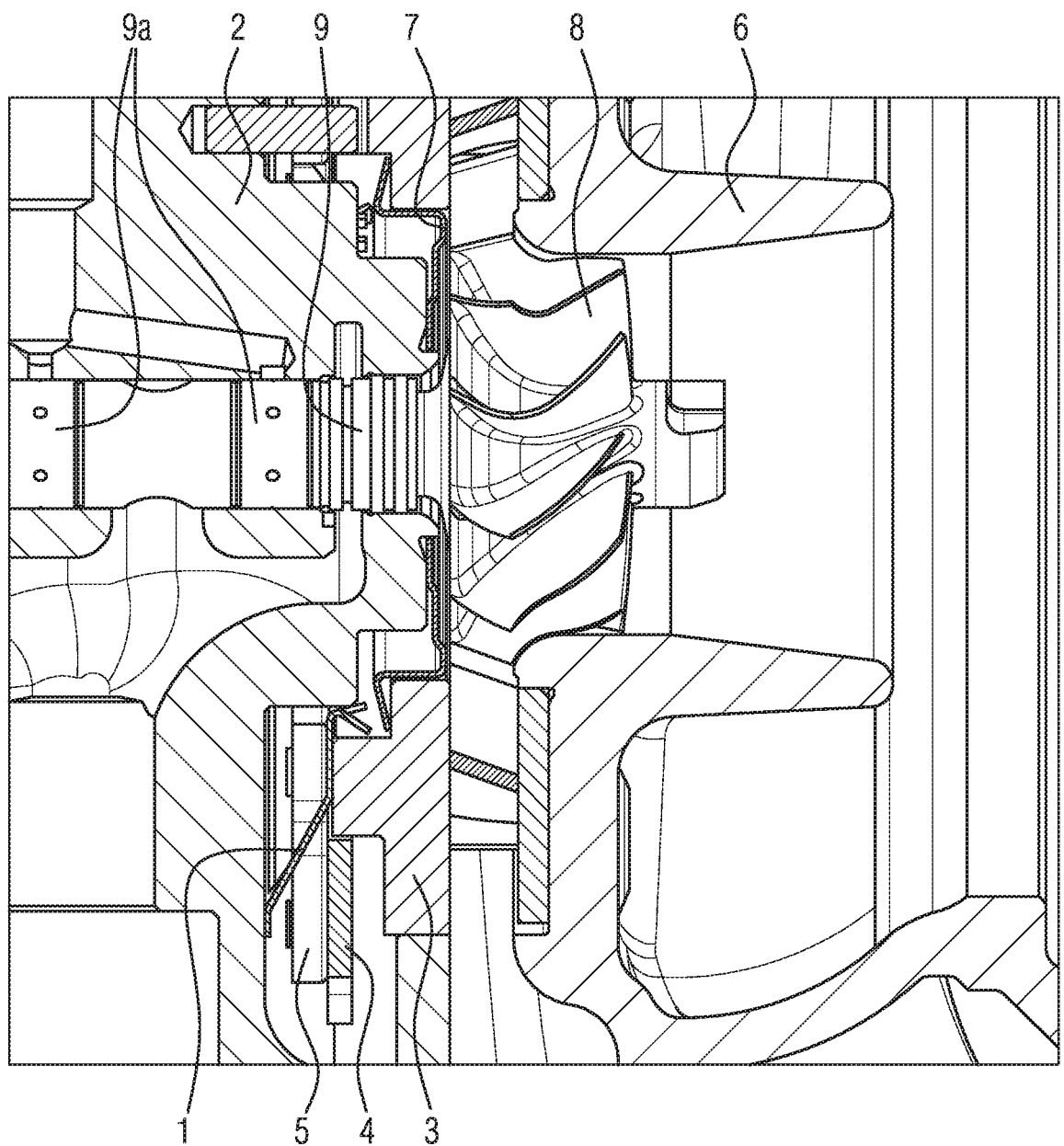
FIG. 1 a vertical section through a part of a turbocharger device.

FIG. 1 shows a vertical sectional view of a part of a turbocharger device. A turbine wheel 8 arranged on a shaft 9 is mounted inside a turbine housing 6. The shaft 9 is arranged in a corresponding bore in a bearing housing 2 via shaft bearings 9*a*.

Furthermore, the turbocharger device has a variable turbine geometry (VTG) with a corresponding guide device, by means of which the power output and response behavior of the turbocharger can be adapted to different operating conditions of the internal combustion engine. For this, the corresponding variable turbine geometry has rotatable guide blades which are rotatably mounted on guide blade rings, of which one guide blade ring is designated 3 in FIG. 1. Furthermore, a blade lever 5 and an adjustment ring 4 are shown.

A component 7 which serves as a heat shield and surrounds the shaft is provided between the bearing housing 2 and turbine wheel 8. This component 7 extends radially outwardly up to the blade ring 3.

Figure 2:
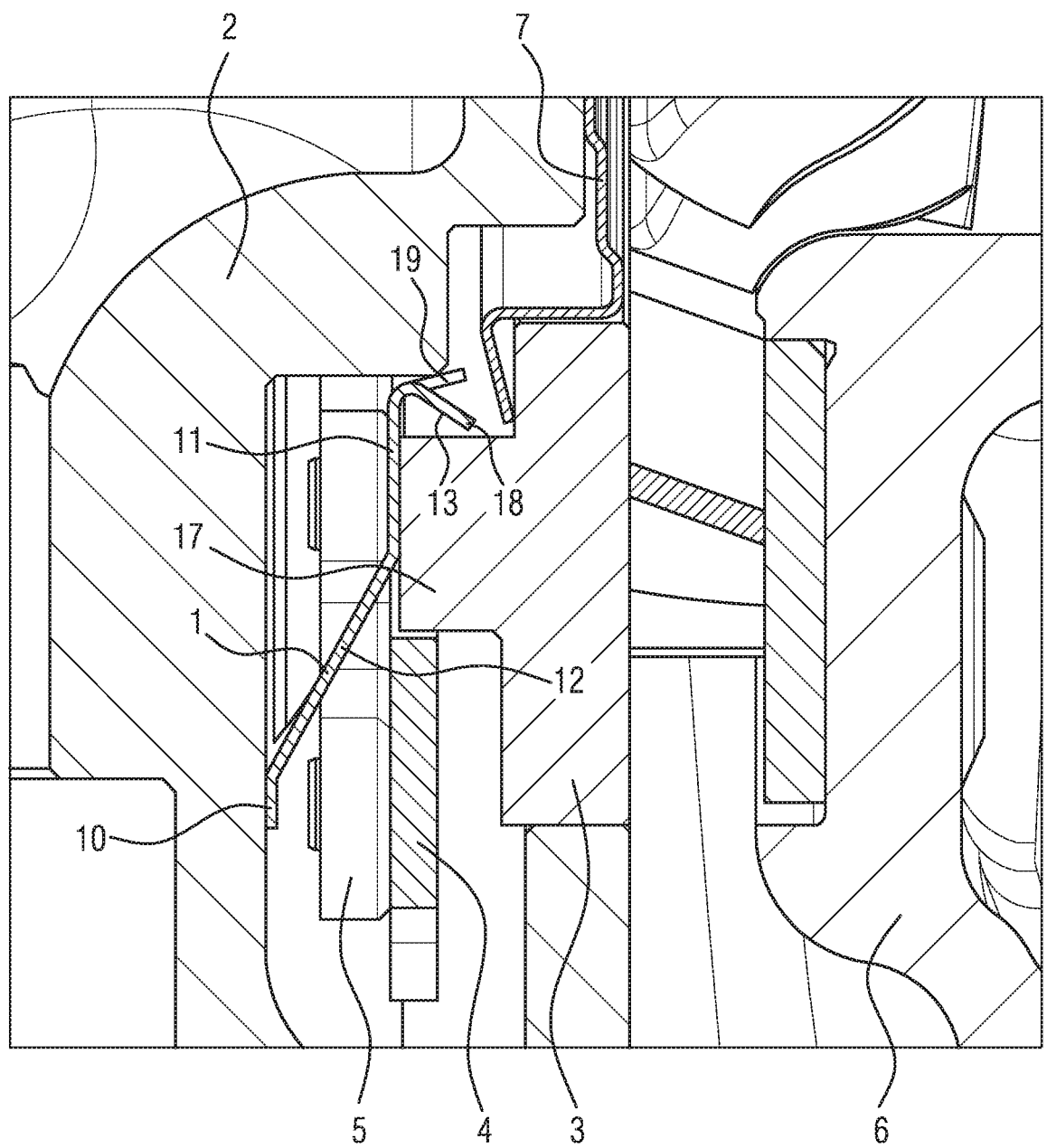
FIG. 2 an enlarged sectional view of a part of FIG. 1.

Furthermore, a spring element 1 is arranged between the bearing housing 2 and the blade ring 3 of the variable turbine geometry, and presses the blade ring 3 and hence the entire guide device of the variable turbine geometry against the turbine housing 6. The precise position and configuration of the spring element 1 are shown in the enlarged depiction of FIG. 2. A closed, continuous, annular outer flange 10 of the spring element 1 bears superficially on the bearing housing 2. A plurality of tabs extend radially inwardly from said outer flange. These tabs have an oblique portion 12 adjoining a radially running, inner portion 11 which extends parallel to the outer flange 10. An angled spring arm portion 13 extending up to the blade ring 3 adjoins the inner flange 11.

The radially inner portion 11 of the spring element 1 bears superficially on a protruding portion 17 of the blade ring 3, wherein the angled spring arm portion 13 engages around this protruding portion 17.

Figure 3:
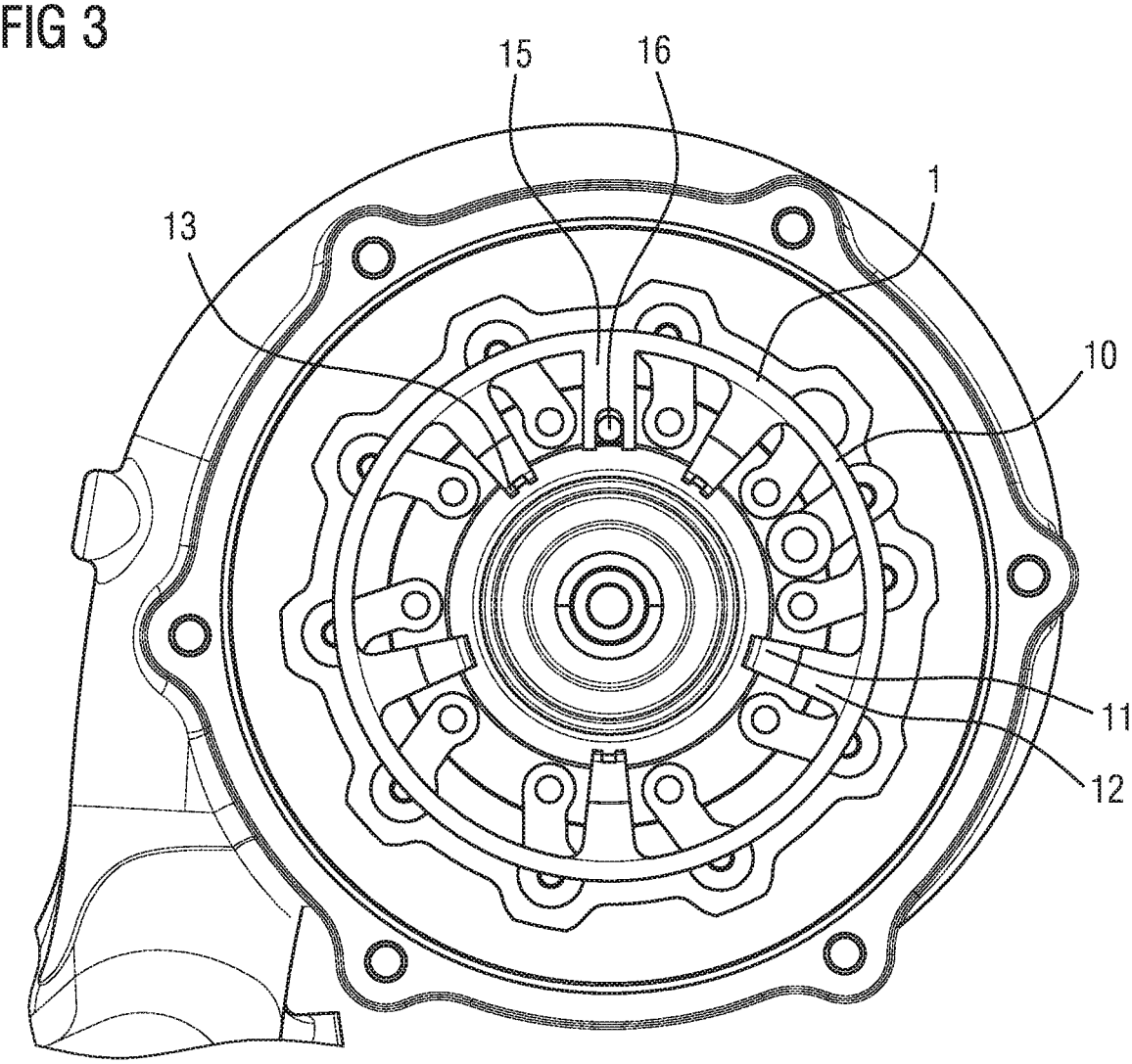
FIG. 3 an end view of a part of the turbocharger device viewed in the direction of the turbine wheel.
Figure 4:
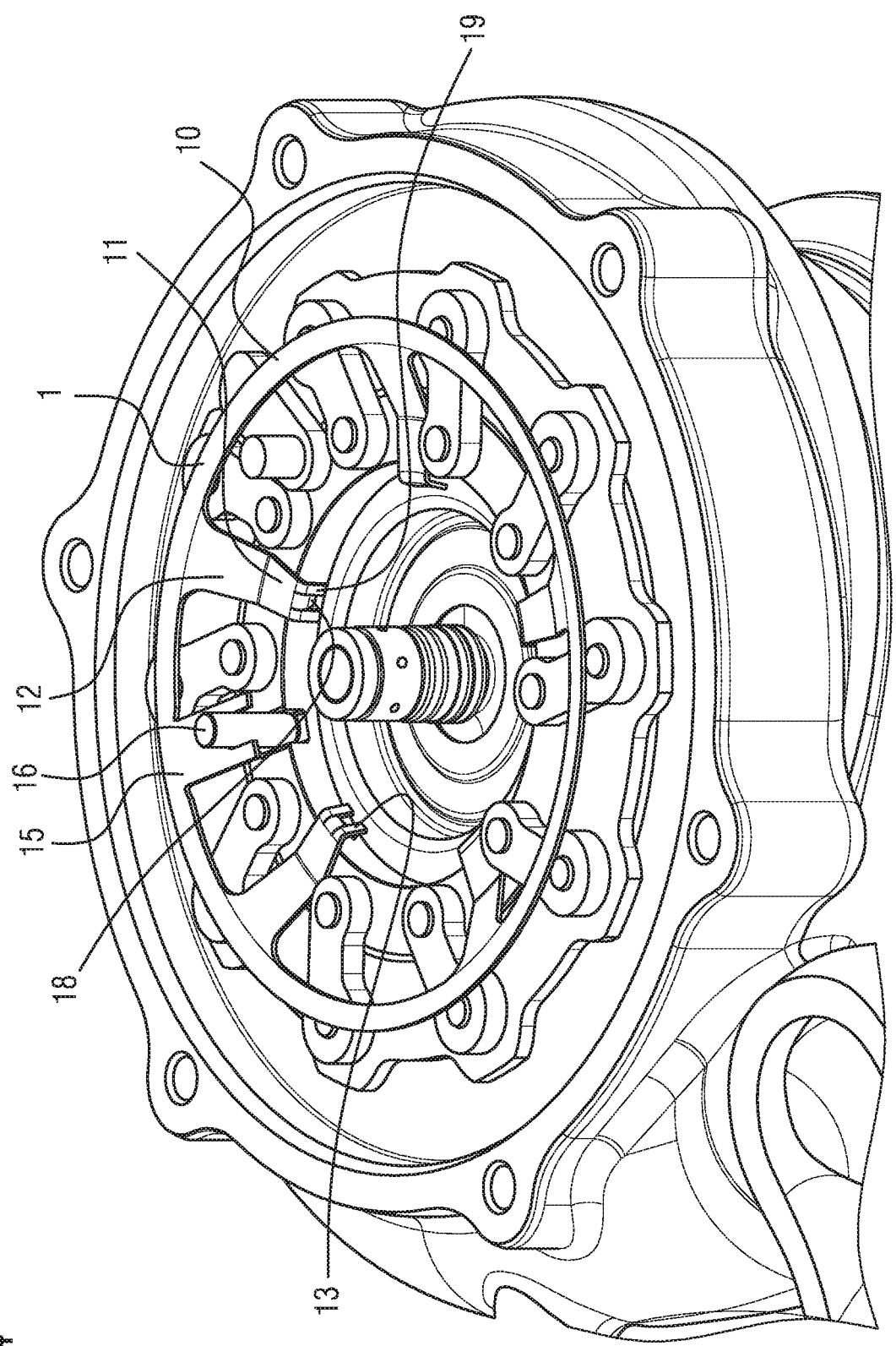
FIG. 4 a spatial view of the part of the turbocharger device from FIG. 3.

FIGS. 3 and 4 show an end view and a spatial view of the spring element 1. It is evident that five tabs with an oblique portion 12 and an inner flange 11 extend radially inwardly from the circumferential annular outer flange 10, wherein the inner flange 11 bears on the protruding portion 17 of the blade ring 3. The angled spring arm portion 13 comprises two outer spring arms 19 and one inner spring arm 18, which support the spring element 1 both on the bearing housing and on the blade ring. The spring element 1 has an additional tab 15 which cooperates with a pin 16 for fixing or orientation in the circumferential direction.

The spring element 1 shown in the figures therefore resembles a release spring of a car clutch. The spring tabs protruding inwardly from the closed annular outer flange 10 press on the blade ring 3 between the individual guide blades. It is decisive for good function of the spring element that it bears with its closed annular outer flange 10 on the bearing housing 2, which is here regarded as a cold component, and bears with a plurality of inner flanges 11 (formed by the tabs) on the guide device of the variable turbine geometry, which is here regarded as a hot component. In this way, the spring is cooler in the radially outer region than in the radially inner region, which leads to a slight force loss since the spring tries to straighten itself in the inner region in the hot state because of the greater thermal expansion.

The invention claimed is:

1. A turbocharger device, comprising:
a bearing housing;
a shaft disposed rotatably in said bearing housing;
a turbine wheel disposed on said shaft;
a turbine housing for said turbine wheel;
a guide device of a variable turbine geometry disposed between said bearing housing and said turbine housing, said guide device having a blade ring;
an annular spring element disposed between said bearing housing and said guide device for axially clamping said guide device against said turbine housing, said annular spring element resting radially outwardly on said bearing housing and radially inwardly on a component of said guide device;
said annular spring element having an annular radial outer flange in contact with said bearing housing and a multiplicity of tabs extending from said annular radial outer flange obliquely radially inwardly in a direction of said guide device and coming into contact with said component of said guide device;
said tabs having a portion extending obliquely radially inwardly in the direction of said guide device and a radial inner portion disposed adjacent said radially inwardly extending portion and being in contact with said component of said guide device, said radial inner portion of said tabs having an adjacent angled spring arm portion, said angled spring arm portion resting both on said bearing housing and on said blade ring.

2. The turbocharger device according to claim 1, wherein the turbocharger device is part of an exhaust gas turbocharger of an internal combustion engine.

3. The turbocharger device according to claim 1, wherein said radial inner portion runs parallel to said annular radial outer flange.

4. The turbocharger device according to claim 1, wherein said annular radial outer flange has notches or cutouts forming said tabs.

5. The turbocharger device according to claim 1, wherein said guide device has a blade ring, and said annular spring element is disposed between said bearing housing and said blade ring of said guide device.

6. The turbocharger device according to claim 5, wherein said guide device has blades, and said tabs of said annular spring element press against said blade ring between said blades of said guide device.

7. The turbocharger device according to claim 1, wherein said guide device has an axially protruding portion, and said radial inner portion of said tabs bears superficially on said axially protruding portion and engages around said axially protruding portion with said angled spring arm portion.

8. The turbocharger device according to claim 1, wherein said annular spring element has at least one of an additional tab or a pin fixing said annular spring element in a circumferential direction on said component of said guide device.

9. The turbocharger device according to claim 1, which further comprises a further component in addition to and radially inside said annular spring element, said component serving as a heat shield between said bearing housing and said turbine wheel.

10. The turbocharger device according to claim 9, wherein said guide device has a blade ring, and said component serving as a heat shield extends annularly around said shaft up to said blade ring of said guide device.

11. The turbocharger device according to claim 9, wherein said annular spring element presses axially against said component serving as a heat shield.

12. A turbocharger device, comprising:
a bearing housing;
a shaft disposed rotatably in said bearing housing;
a turbine wheel disposed on said shaft;
a turbine housing for said turbine wheel;
a guide device of a variable turbine geometry disposed between said bearing housing and said turbine housing; and
an annular spring element disposed between said bearing housing and said guide device for axially clamping said guide device against said turbine housing, said annular spring element resting radially outwardly on said bearing housing and radially inwardly on a component of said guide device;
said annular spring element having an annular radial outer flange in contact with said bearing housing and a multiplicity of tabs extending from said annular radial outer flange obliquely radially inwardly in a direction of said guide device and coming into contact with said component of said guide device;
said tabs having a portion extending obliquely radially inwardly in the direction of said guide device and a radial inner portion disposed adjacent said radially inwardly extending portion and being in contact with said component of said guide device, and said radial inner portion of said tabs having an adjacent angled spring arm portion, said angled spring arm portion having an inner spring arm and an outer spring arm.

13. The turbocharger device according to claim 1, wherein said annular spring element is made of heat-resistant sheet metal with spring properties.

* * * * *